UNITED STATES PATENT OFFICE 2,402,051

CATALYSTS

Vladimir N. Ipatieff and Louis Schmerling, Chicago, Ill., assignors to Universal Oil Products Company, Chicago, Ill., a corporation of Delaware No Drawing. Application May 14, 1942, Serial No. 443,008

12 Claims. (Cl. 252—228.2)

The present invention is concerned with catalysts which are useful in accelerating the rates of various types of hydrocarbon conversion reactions such as cracking of heavy hydrocarbon mixtures to produce lower-boiling motor fuel fractions, treating motor fuels to increase their antiknock rating, isomerizing paraffin or naphthene hydrocarbons, alkylating aromatics or isoparaffins with olefins and alternative alkylating agents, polymerization of unsaturated hydrocarbons to form higher molecular weight polymers and other reactions.

Various types of catalysts are employed both for accelerating the reaction rates in the types of conversion mentioned and for altering their course in the direction of increased yields of desired products. Such catalysts are of many types and include metals, metal oxides, salts and special composites prepared for use in particular conversion reactions. The present invention is concerned with novel types of catalysts which are utilizable in a wide variety of different hydrocarbon conversions so that in general their utility is greater than that of many other types of catalysts.

In one specific embodiment the present invention relates to a catalyst for hydrocarbon conversion reactions which is made by interacting a phosphoric acid and a metal halide.

We have found that hydrocarbon conversion catalysts may be made by interacting acids of phosphorus with metal halides of the Friedel-Crafts type under conditions so that limited amounts of hydrogen halides are evolved. It is apparent that, since there are on the one hand several phosphoric acids, and on the other hand, a number of Friedel-Crafts type metal halides which may be interacted, a considerable number of alternative catalysts can be made although they will not necessarily be equivalent in their action in catalyzing any particular type of hydrocarbon reaction. The phosphoric acids which may be used in preparing the catalyst of this invention include ortho-phosphoric acid, pyrophosphoric acid and meta-phosphoric acid.

Friedel-Crafts metal halides which are reacted with the phosphoric acids to form useful hydrocarbon conversion catalysts in accordance with the present invention include such salts as aluminum chloride, aluminum bromide, zinc chloride, zirconium chloride, ferric chloride, antimony chloride, bismuth chloride, and others. Aluminum chloride is as a rule the most generally utilized Friedel-Crafts catalyst in hydrocarbon conversion reactions of the types mentioned as its activity is usually higher than those of other members of the group under a given set of conditions. However, disadvantages attend its use in some instances on account of its high degree of activity. Thus, it requires handling in the absence of water since it is readily hydrolyzed and ultimately loses its catalytic activity when hydrolyzed beyond a certain point. In reactions such as polymerization wherein higher boiling polymers are formed from lower molecular weight olefins, there is a tendency for it to form hydrocarbon-aluminum chloride complexes rather than to form polymers and when elevated temperatures are employed, there is an increased tendency for undesirable decompositions to occur. By reacting proportioned mixtures of aluminum halides and phosphoric acids in accordance with the present invention, the activities of such catalysts are modified and different hydrocarbon conversions may be more accurately controlled.

Catalytic materials formed by the interaction of ortho-phosphoric acid and aluminum chloride typify the present invention. For example, in forming such a catalyst, equimolal proportions of ortho-phosphoric acid and finely divided substantially anhydrous aluminum chloride may be mixed and reaction brought about by heating the mixture to a temperature of about 80° C. at which point a vigorous evolution of hydrogen chloride takes place and a pale yellowish powder is left which apparently contains a compound having the formula $Cl_2AlOPO(OH)_2$ in admixture with unreacted aluminum chloride. This composite material has definite catalytic activity in hydrocarbon conversion reactions. When the mixture of phosphoric acid and aluminum chloride is heated at temperatures substantially higher than 80° C., more hydrogen chloride is evolved and, as a rule, the catalytic activity of the composites decreases if more than one mole of hydrogen chloride based on the aluminum chloride is formed when approximately equimolar mixtures of the phosphoric acid and the aluminum chloride are used. When proportionately larger amounts of aluminum chloride are mixed with the phosphoric acid, composites having generally higher catalytic activities may be produced which may owe their increased activity to the presence of uncombined aluminum chloride.

Composite catalytic materials analogous to those described in connection with ortho-phosphoric acid and aluminum chloride can be made by reacting other phosphoric acids with aluminum chloride or with other metal halides such as those already mentioned as being catalysts of the Friedel-Crafts type. The catalytic activity of these alternative materials may vary considerably from those of high activity made from aluminum chloride or aluminum bromide and phosphoric acids to those having catalytic activity of a lower order more suitable for less difficultly catalyzable reactions. Furthermore, some of these materials may be active catalysts for certain reactions and less active for others. Not all of them necessarily exert their maximum catalytic activity under identical conditions having regard for any given reaction.

Catalysts of the present type are utilizable in powdered form in suspension in hydrocarbons as a slurry when hydrocarbons are being isomerized or alkylated under liquid or mixed phase conditions and may be used in both batch or continuous processes. In contrast to aluminum halide catalysts they do not form any substantial amounts of complexes with unsaturated hydrocarbons so that they may be used in continuous processes over long periods of time without contamination with such complexes so that in many instances their life is considerably longer than the life of the corresponding aluminum halides in similar types of reactions.

The following examples are given of the preparation and use of catalysts of the present type although with no intention of limiting the scope of the invention in exact correspondence therewith.

Example I

A catalyst was made by intimately mixing at ordinary temperatures equimolar proportions of 100 per cent ortho-phosphoric acid and finely divided aluminum chloride and heating gradually to a temperature of 80° C. until the evolution of hydrogen chloride ceased. The residual material was a pale yellowish powder.

That this catalyst was active for the alkylation of benzene was shown by adding 5 parts by weight of the catalyst to a mixture of 80 parts by weight of benzene and 21 parts by weight of propylene in a pressure vessel in which the added materials were stirred for a period of 4 hours at 25° C. 97 parts by weight of liquid product was formed which had the following distillation characteristics:

| Fraction | Volume per cent |
|---|---|
| 75–85° C | 51 |
| 85–125° C | 2 |
| 125–145° C | 1 |
| 145–163° C | 25 |
| 163–200° C | 5 |
| Residue | 13 |

From the above data it will be seen that there is a definite production of alkylated benzenes particularly isopropyl benzene since about half of the material recovered from the pressure vessel boiled above 85° C.

Example II

The catalyst prepared as described above was also active for the alkylation of isobutane with propene. 85 parts by weight of isobutane, 20 parts by weight of propylene, 4 parts by weight of hydrogen chloride and 10 parts of the catalyst were added to a pressure vessel and the contents were maintained at a temperature of 60° C. for a period of 4 hours. 35 parts by weight of normally liquid hydrocarbons were produced which had the following boiling range characteristics:

| Fraction | Volume per cent |
|---|---|
| Condensible at −78° C | 9 |
| Initial boiling point to 40° C | 20 |
| 40–75° C | 26 |
| 75–95° C | 8 |
| 95–125° C | 15 |
| 125–150° C | 8 |
| Residue | 14 |

The boiling range of products indicates that a considerable yield of alkylated products was formed, particularly in respect to fractions boiling between 75 and 125° C. which constituted about 25 per cent by volume of the liquid products.

Example III

Using the prepared catalyst, heptane was isomerized at 100° C. to produce a 20 per cent volume yield of isoheptanes. In the test a sample of a commercial heptane having an octane number of 57.9 was heated for 4 hours in the presence of the catalyst at a temperature of 100° C. The octane number of the recovered liquid was found to be 61.2.

We claim as our invention:

1. A process for the manufacture of a catalyst which comprises mixing an aluminum halide and a phosphoric acid selected from the group consisting of ortho, meta and pyro phosphoric acids and heating to cause interaction of the acid and the aluminum halide and to evolve a substantial amount of hydrogen halide but not substantially in excess of one mol based on the aluminum halide.

2. A process for the manufacture of a catalyst which comprises heating a substantially equimolal mixture of ortho-phosphoric acid and substantially anhydrous aluminum chloride to a temperature of about 80° C. until about one mol of hydrogen chloride is evolved, and discontinuing said heating when about one mol of hydrogen chloride has been evolved.

3. A process for the manufacture of a catalyst which comprises forming a substantially equimolar mixture of an aluminum halide and a phosphoric acid selected from the group consisting of ortho, meta and pyro phosphoric acids and heating to cause the interaction of said acid and said aluminum halide and to evolve a substantial amount of hydrogen halide but not substantially in excess of one mol based on the aluminum halide.

4. A process for the manufacture of a catalyst which comprises forming a substantially equimolar mixture of a phosphoric acid selected from the group consisting of ortho, meta and pyro phosphoric acids and aluminum chloride and heating to cause the interaction of said acid and said aluminum chloride and to evolve a substantial amount of hydrogen chloride but not substantially in excess of one mol based on the aluminum chloride.

5. A process for the manufacture of a catalyst which comprises forming a mixture of an aluminum halide and a phosphoric acid selected from the group consisting of ortho, meta and pyro phosphoric acids in which the aluminum halide is in molar excess in respect to the phosphoric acid and heating to cause interaction of said acid and said aluminum halide and to evolve hydrogen halide in an amount not substantially in excess of one mol based on the aluminum halide.

6. A process for the manufacture of a catalyst which comprises forming a mixture of a phosphoric acid selected from the group consisting of ortho, meta and pyro phosphoric acids and aluminum chloride in which the aluminum chloride is in molar excess in respect to the phosphoric acid and heating to cause interaction of said acid and said aluminum chloride and to evolve hydrogen chloride in an amount not substantially in excess of one mol based on the aluminum chloride.

7. The solid reaction product of a substantially anhydrous aluminum halide with a phosphoric acid selected from the group consisting of ortho, meta and pyro phosphoric acids, said product resulting from the heating of the aluminum halide and the phosphoric acid sufficiently to evolve a substantial amount of hydrogen halide but not substantially in excess of one mol based on the aluminum halide.

8. The solid reaction product of substantially anhydrous aluminum chloride with a phosphoric acid selected from the group consisting of ortho, meta and pyro phosphoric acids, said product resulting from the heating of the aluminum chloride and the phosphoric acid sufficiently to evolve a substantial amount of hydrogen chloride but not substantially in excess of one mol based on the aluminum chloride.

9. The solid reaction product of a substantially anhydrous aluminum halide with ortho-phosphoric acid, said product resulting from the heating of the aluminum halide and the phosphoric acid sufficiently to evolve a substantial amount of hydrogen halide but not substantially in excess of one mol based on the aluminum halide.

10. The solid reaction product of substantially anhydrous aluminum chloride with ortho-phosphoric acid, said product resulting from the heating of the aluminum chloride and the phosphoric acid sufficiently to evolve a substantial amount of hydrogen chloride but not substantially in excess of one mol based on the aluminum chloride.

11. The solid reaction product of a substantially anhydrous aluminum halide with pyro-phosphoric acid, said product resulting from the heating of the aluminum halide and the phosphoric acid sufficiently to evolve a substantial amount of hydrogen halide but not substantially in excess of one mol based on the aluminum halide.

12. The solid reaction product of substantially anhydrous aluminum chloride with pyro-phosphoric acid, said product resulting from the heating of the aluminum chloride and the phosphoric acid sufficiently to evolve a substantial amount of hydrogen chloride but not substantially in excess of one mol based on the aluminum chloride.

VLADIMIR N. IPATIEFF.
LOUIS SCHMERLING.